United States Patent [19]
White

[11] Patent Number: 4,876,822
[45] Date of Patent: Oct. 31, 1989

[54] FLYING INSECT CONTROL UNIT USING LIGHTS AND ADHESIVES

[76] Inventor: James N. White, 506 Exton Rd., Hatboro, Pa. 19040

[21] Appl. No.: 333,168

[22] Filed: Apr. 4, 1989

[51] Int. Cl.⁴ .............................................. A01M 1/04
[52] U.S. Cl. ...................................... 43/113; 43/114; 43/116
[58] Field of Search ................. 43/107, 113, 114, 115, 43/116, 117, 119

[56] References Cited

U.S. PATENT DOCUMENTS

| | | | |
|---|---|---|---|
| 449,138 | 3/1891 | Roth | 43/114 |
| 1,182,389 | 2/1916 | Levine | 43/114 |
| 1,461,169 | 8/1922 | Wilson | 43/113 |
| 3,023,539 | 8/1960 | Emerson | 43/113 |
| 4,074,457 | 10/1983 | Sato et al. | 43/114 |
| 4,086,721 | 5/1978 | Deas | 43/113 |
| 4,117,624 | 10/1978 | Phillips | 43/113 |
| 4,411,093 | 10/1978 | Stout et al. | 43/113 |
| 4,654,998 | 4/1987 | Clay | 43/113 |

Primary Examiner—Nicholas P. Godici
Assistant Examiner—Michael William Starkweather
Attorney, Agent, or Firm—Caesar, Rivise, Bernstein, Cohen & Pokotilow, Ltd.

[57] ABSTRACT

A flying insect control unit includes an enclosure having an internal compartment provided by a bottom wall and a closed peripheral sidewall extending laterally from the bottom wall. The bottom wall includes peripheral edges defining a passageway extending through it, and also includes a continuous surface adjacent to at least one of the peripheral edges defining the passageway. A member for trapping flying insects thereon has a bottom surface which is adhered to the continuous surface of the bottom wall of the enclosure, and an upper light reflective surface with a material thereon (e.g., preferably a solid, sticky substance) for trapping flying insects. A light source for emitting ultraviolet radiation is positioned within the compartment for emitting light which is transmitted through the passageway, and also which is reflected toward an upper opened end of the compartment by the light-reflective surface.

21 Claims, 3 Drawing Sheets

FLYING INSECT CONTROL UNIT USING LIGHTS AND ADHESIVES

FIELD OF THE INVENTION

This invention relates generally to a flying insect control unit, and more specifically to a flying insect control unit capable of illuminating an area, while at the same time attracting flying insects thereto.

BACKGROUND ART

There have been a number of suggestions in the prior art for providing flying insect control units for trapping flying insects in areas where they are not desired. The least desirable areas for flying insects are in restaurants and in other facilities in which food is served. In these latter facilities it is extremely important to provide a unit which is aesthetically appealing, or at the very least, one which will not permit the trapped insects to be easily viewed by the patrons of the facility.

Another desired attribute of flying insect control units, particularly in poorly lighted areas, is to be capable of providing adequate illumination, while at the same time employing that illumination to lure flying insects into the unit.

A number of prior art units are believed to be unduly complex and expensive. A number of prior art units also are incapable of concealing the trapped insects from the view of patrons in the facility where the unit is employed. Still other prior art units do not provide, or are not capable of providing optimum lighting characteristics to both illuminate an area in which the control unit is utilized and to lure flying insects to said unit.

Exemplary prior art constructions which suffer from one or more of the above deficiencies are disclosed in U.S. Pat. Nos. 4,117,624 (Phillips); 4,411,093 (Stout et al.); 4,074,457 (Sato et al.); 1,723,919 (Bykowy); 1,182,389 (Levine) and 449,138 (Roth).

OBJECTS OF THIS INVENTION

It is a general object of this invention to provide a flying insect control unit which is simple in design, inexpensive to construct and reliable in operation.

It is a further object of this invention to provide a flying insect control unit which is aesthetically pleasing, and which completely obscures an insect-retaining surface thereof from the view of patrons or other individuals in the facility where the unit is employed.

It is a further object of this invention to provide a flying insect control unit employing a sticky substance, in a non-liquid state, to trap insects in an efficient, non-obtrusive manner.

It is a further object of this invention to provide a flying insect control unit which is capable of being attached to a like unit, to thereby enhance the insect trapping characteristics of the system.

It is a further object of this invention to provide a flying insect control unit which effectively illuminates an area to both light-up the area and lure flying insects to the unit.

SUMMARY OF THE INVENTION

The above and other objects of this invention are achieved in a flying insect control unit including an enclosure having an internal compartment provided by a bottom wall and a closed peripheral sidewall means extending laterally from the bottom wall. The bottom wall includes peripheral edges defining a passageway extending through it, and also includes a continuous surface adjacent to at least one of the peripheral edges defining the passageway. A member for trapping flying insects thereon has a bottom surface which is adhered to the continuous surface of the bottom wall, and an upper, light-reflective surface having a material thereon (e.g., preferably a solid, sticky substance) for trapping flying insects. A light source for emitting ultraviolet radiation is positioned within the compartment, above both the light-reflective surface of the insect-trapping member and the passageway through the bottom wall of the enclosure, whereby light emitted by the light source is transmitted through the passageway, and also is reflected toward an upper opened end of the compartment by the light-reflective surface. The material with the reflective surface thereon, by virtue of being attached to the inner surface of the bottom wall of the closure, is concealed from view during use of the unit.

In a preferred embodiment of this invention the light source is in vertical alignment with the passageway through the bottom wall, whereby light emitted from the light source is transmitted directly through the passageway, in addition to being reflected toward the upper end of the compartment from the light-reflective surface of the insect-trapping material.

In a preferred form of this invention a removal closure is optionally provided for closing the upper opening into the compartment to prevent light from exiting through said upper opening when less reflective characteristics are desired for the unit.

In accordance with a preferred arrangement in this invention a mounting structure is provided to connect two control units together. Most preferably the mounting structure includes additional attachment means to permit the mounting structure, and insect control units attached thereto, to be suspended from an additional structure (e.g., the ceiling of a facility in which the unit(s) is (are) employed).

BRIEF DESCRIPTION OF THE DRAWINGS

Other objects and many of the attendant advantages of this invention will be readily appreciated as the same becomes better understood by reference to the following detailed description when considered in connection with the accompanying drawings wherein.

DESCRIPTION OF THE PREFERRED EMBODIMENTS OF THE INVENTION

Figure 1:
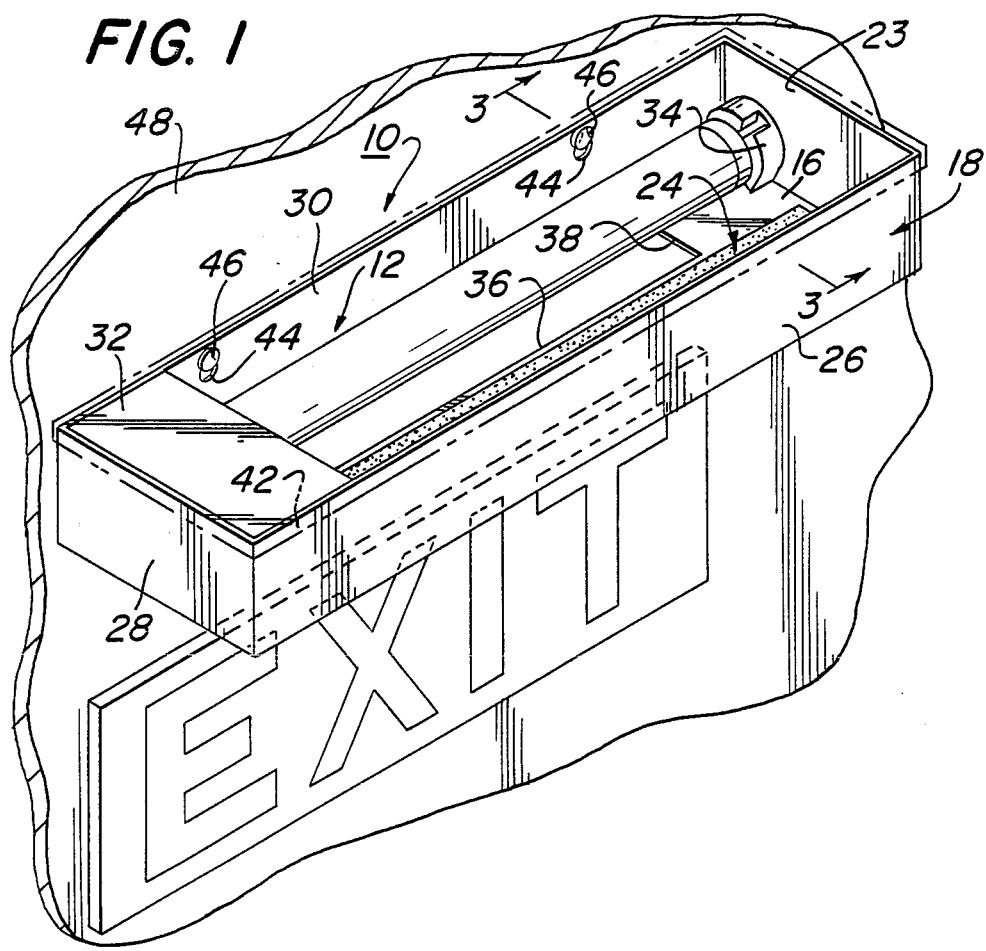
FIG. 1 is an isometric view of a flying insect control unit of this invention, showing its use both to illuminate an information sign (e.g., an exit sign) and to lure insects to be trapped thereto.

Referring now in greater detail to the various figures of the drawings, wherein like reference characters refer to like parts, a flying insect control unit embodying the present invention is generally shown at 10 in FIG. 1. The device 10 basically includes an ultraviolet light source 12 for emitting insect-attracting light rays through at least one passageway 14 provided in a bottom wall 16 of an enclosure 18, for the purpose of luring insects into the enclosure through said passageway. Once the insects are lured into the passageway 14 they are trapped by a sticky layer or coating 20 (FIG. 3) provided on an outer exposed reflective surface 22 of a strip member 24, which strip is secured to the bottom wall 16 of the enclosure.

Referring to FIG. 1, the enclosure 18 is generally rectangular in plan view, including a pair of substantially parallel long sidewalls 26 and a pair of substantially parallel short end walls 28. Both the sidewalls and end walls extend laterally from the planar bottom wall 16 to define an interior compartment 30 in which the light source 12 and reflective insect-trapping strip 24 are retained.

Figure 2:
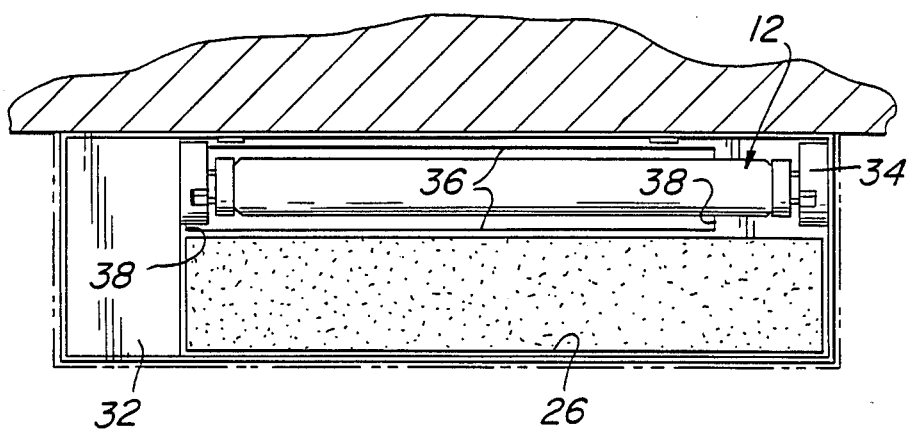
FIG. 2 is a plan view of the unit shown in FIG. 1.

As can be seen best in FIGS. 1 and 2, the light source 12 is in the form of an elongate, fluorescent lamp extending parallel to the long sidewalls 26 of the enclosure. The lamp is secured to a ballast 32 adjacent one of the end walls 28 of the enclosure, and to a conventional electrical connector 34 mounted to the other end wall 28.

Still referring to FIGS. 1 and 2, the passageway 14 in the bottom wall 16 preferably is rectangular in plan view; being provided by a pair of parallel long edges 36 and a pair of parallel short edges 38.

In accordance with the preferred embodiment of this invention the light source 12 is mounted above the elongated passageway 14 and the insect-trapping strip 24, and is in vertical alignment with said passageway. Most preferably the elongate axis of the fluorescent light source 12 is parallel to the elongate dimension of the passageway 14.

Figure 3:
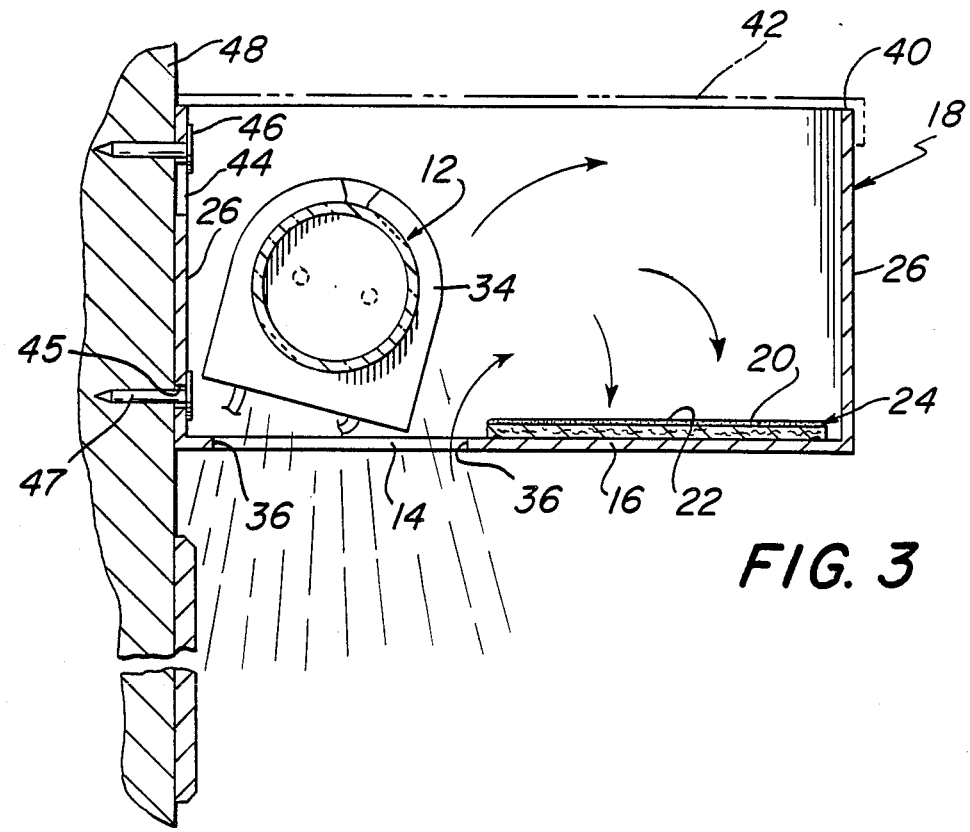
FIG. 3 is a sectional view taken along line 3—3 of FIG. 1.

Referring to FIGS. 1 through 3, the reflective, insect-trapping strip 24 is secured to a continuous surface of the bottom wall 16, adjacent to the elongate passageway 14.

There are two benefits achieved by providing the light source 12 in vertical alignment with the passageway 14, and providing the elongate insect-trapping strip 24 on the bottom wall 16 of the enclosure, in a region which does not overlap the passageway. First, this arrangement of elements conceals trapped insects from view. Second, this arrangement of elements, in addition to permitting the direct transmission of light rays through the passageway 14, causes other light rays to be reflected off of the outer reflective surface 22 of the strip 24 and out of the open upper end 40 of the enclosure 18. If desired, a top member, shown in phantom representation at 42 (FIGS. 1 and 3), can be provided to close the upper opening 40 into the enclosure 18, to thereby preclude light rays from exiting therefrom. This latter arrangement may be preferred in certain environments, where less illumination is desired.

Figure 4:
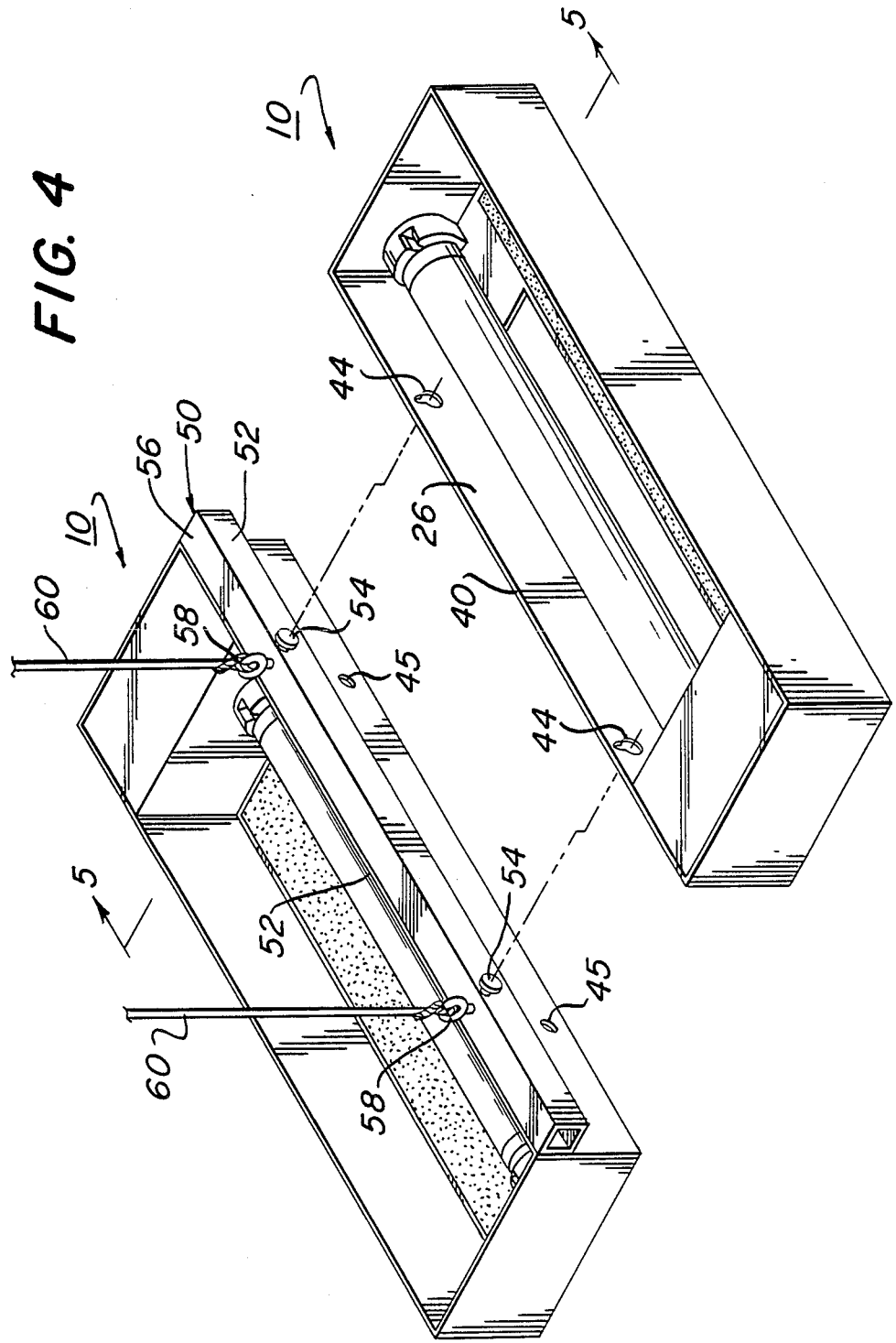
FIG. 4 is an exploded isometric view illustrating two units of this invention, and a mounting strip for interconnecting those units together.

Referring to FIGS. 1, 3 and 4, a pair of keyhole openings 44 are provided in one of the elongate sidewalls 26, adjacent the upper margin 40 of the enclosure. These openings are spaced-apart along the sidewall for receiving a complimentary pair of headed fasteners 46 (FIGS. 1 and 3) in a well-known manner, for the purpose of securing the control unit to a mounting structure. If desired, a second pair of openings 45 an be provided adjacent the lower end of the same elongate sidewall 26 in which the keyhole openings 44 are provided, for receiving a second pair of headed fasteners 47 to further stabilize the mounting of the unit. This second pair of openings 45 can either be circular (as illustrated in FIG. 4) or of the same keyhole configuration as the openings 44.

As is shown in FIGS. 1 and 3, the mounting structure is a vertical wall 48, and the control unit 10, in addition to being employed to trap insects, is also employed to illuminate an informational sign (e.g., an exit sign).

Figure 5:
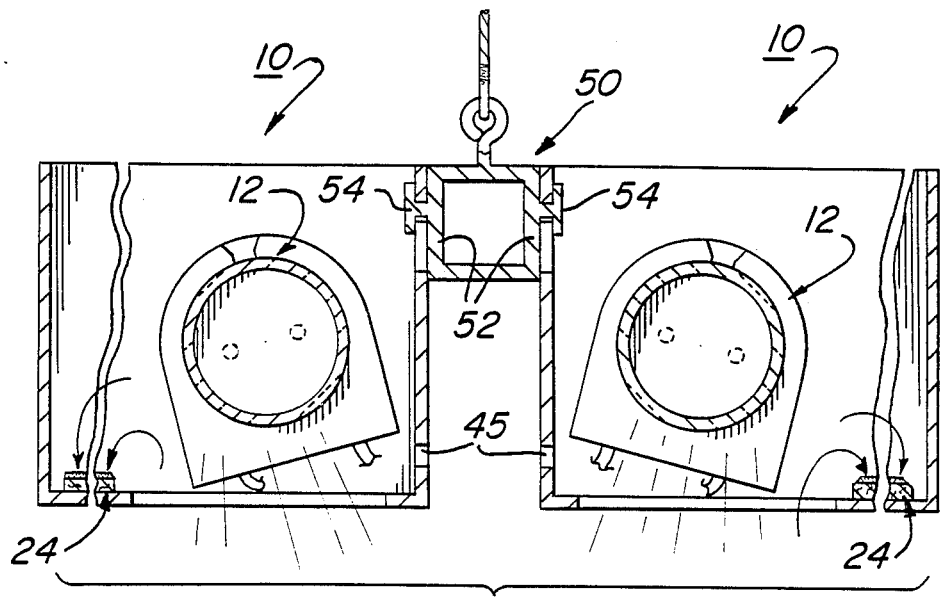
FIG. 5 is a sectional view taken along line 5—5 of FIG. 4, but with the units attached to the mounting strip.

Referring to FIGS. 4 and 5, an additional feature of this invention resides in the provision of an elongate connecting strip 50 for use in interconnecting two control units 10 together. The elongate connecting strip preferably is square or rectangular in cross section, and includes a pair of elongate sidewalls 52, each of which includes a pair of laterally spaced-apart, headed studs 54 which are capable of being received in a complimentary pair of keyhole openings 44 in one of the control units 10. As can be seen best in FIG. 4, the connecting strip 50 also includes an upper elongate wall 56 including a pair of spaced-apart eyelets 58 therein, for permitting the strip, and the control unit(s) 10 attached thereto, to be secured to a ceiling (not shown) through supporting chains 60 or similar suspension devices. In the most preferred embodiment of this invention the connecting strip 50 has substantially the same elongate dimension as that of each of the control units 10 to which it is attached.

Without further elaboration the forgoing will so fully illustrate my invention that others may, by applying current or future knowledge, adopt the same for use under various conditions of service.

I claim:
1. A flying insect control unit including:
   a. an enclosure including a compartment provided by a bottom wall and a closed peripheral side wall means extending laterally from said bottom wall and terminating in upper marginal edges defining an upper opening into said compartment;
   b. said bottom wall including peripheral edges defining a passageway extending through a portion of said bottom wall, said bottom wall including a continuous surface adjacent at least one of said peripheral edges;
   c. a member for trapping flying insects thereon, said member including a bottom surface adhered to said continuous surface of the bottom wall, an upper, light-reflective surface and a material on said light reflective surface for trapping flying insects thereon;
   d. a light source for emitting ultraviolet radiation, said light source being disposed above said passageway and said upper, light-reflective surface of said member, whereby light emitted by said light source is transmitted through said passageway and is reflected toward the upper opening into said compartment from the light-reflective surface, said light-reflective surface with the material for trapping flying insects thereon being concealed from view during use of the unit.

2. The flying insect control unit of claim 1, wherein said light source is disposed in vertical alignment with the said passageway, whereby light emitted by said light source is transmitted directly through said passageway.

3. The flying insect control unit of claim 2, wherein said closed peripheral side wall means includes a pair of parallel long sidewalls and a pair of parallel short end walls, said passageway having a long central axis in the plane of the bottom wall which is substantially parallel to the long sidewalls and said light source having an elongate light emitting surface, the central elongate axis of said light emitting surface being substantially parallel to the long central axis of the passageway.

4. The flying insect control unit of claim 2, wherein said compartment has a long dimension and a short dimension substantially normal to said long dimension, said passageway having a long dimension extending in the direction of the long dimension of said compartment, said light source having an elongate light emitting surface, the central elongate axis of said light emitting surface being substantially parallel to the long dimension of said passageway.

5. The flying insect control unit of claim 2, including a removable closure for closing the upper opening into said compartment to prevent light from exiting through said upper opening.

6. The flying insect control unit of claim 2, including openings in the peripheral side wall means for receiving a fastener means therethrough for permitting said unit to be secured to a mounting structure.

7. The flying insect control unit of claim 6, wherein said mounting structure is a wall of a room.

8. The flying insect control unit of claim 6, wherein said mounting structure is a connecting member having said fastener means as an integral part thereof.

9. The flying insect control unit of claim 8, wherein said connecting member includes attachment means for permitting said connecting member to be attached to another mounting structure.

10. The flying insect control unit of claim 8, wherein said connecting member includes integral fastener means on diametrically opposed surfaces, said fastener means on each of said opposed surfaces being adapted to be received within said openings in said peripheral sidewall means of said control unit.

11. The combination of claim 10, further including a second flying insect control unit having a peripheral side wall means with openings therein for receiving the fastener means on one of said diametrically opposed surfaces of the connecting member, said first control unit being attached to the fastener means on one of said diametrically opposed surfaces and the second flying insect control unit being attached to the fastener means on the other of said diametrically opposed surfaces.

12. The flying insect control unit of claim 11, wherein said connecting member includes attachment means for permitting said connecting member to be attached to another mounting structure.

13. The flying insect control unit of claim 3, including openings in at least one of said long sidewalls for receiving a fastener means therethrough for permitting said unit to be secured to a mounting structure.

14. The flying insect control unit of claim 13, wherein said mounting structure is a wall of a room.

15. The flying insect control unit of claim 13, wherein said mounting structure is a connecting member having said fastener means as an integral part thereof.

16. The flying insect control unit of claim 15, wherein said connecting member includes attachment means for permitting said connecting member to be attached to another mounting structure.

17. The flying insect control unit of claim 15, wherein said connecting member includes integral fastener means on diametrically opposed surfaces, said fastener means on each of said opposed surfaces being adapted to be received within said openings in said long sidewall of said control unit.

18. The combination of claim 17, further including a second flying insect control unit having a long peripheral side wall with openings therein for receiving the fastener means on one of said diametrically opposed surfaces of the connecting member, said first control unit being attached to the fastener means on one of said diametrically opposed surfaces and the second flying insect control unit being attached to the fastener means on the other of said diametrically opposed surfaces.

19. The flying insect control unit of claim 18, wherein said connecting member includes attachment means for permitting said connecting member to be attached to another mounting structure.

20. A pair of flying insect control units, each of said units including:
   a. an enclosure including a compartment provided by a bottom wall and a closed peripheral sidewall means extending laterally from said bottom wall;
   b. said bottom wall including peripheral edges defining a passageway extending through a portion of said bottom wall;
   c. a member for trapping flying insects thereon, said member being included in said compartment;
   d. a light source for emitting ultraviolet radiation, said light source being disposed within said compartment for emitting light through said passageway, for attracting flying insects to the member for trapping flying insects thereon;
   e. openings in the peripheral side wall means for receiving fastener means therethrough;
   f. a connecting member having integral fastener means on diametrically opposed surfaces, said fastener means on each of said diametrically opposed surfaces being adapted to be received within the openings in the peripheral sidewall means of one of said pair of control units, whereby said connecting member connects said pair of control units together.

21. The flying insect control unit of claim 20, wherein said connecting member includes attachment means for permitting said connecting member to be attached to another mounting structure.

* * * * *